United States Patent
Hessling-Von Heimendahl et al.

(10) Patent No.: US 10,710,742 B2
(45) Date of Patent: Jul. 14, 2020

(54) EXTERIOR AIRCRAFT LIGHT AND AIRCRAFT COMPRISING THE SAME

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/573,198

(22) Filed: Sep. 17, 2019

(65) Prior Publication Data

US 2020/0094986 A1 Mar. 26, 2020

(30) Foreign Application Priority Data

Sep. 21, 2018 (EP) .................................... 18195931

(51) Int. Cl.
*B64D 47/04* (2006.01)
*B64D 47/06* (2006.01)
*F21S 45/30* (2018.01)
*F21V 31/00* (2006.01)
*F21V 31/03* (2006.01)
*F21W 107/30* (2018.01)

(52) U.S. Cl.
CPC ............. *B64D 47/04* (2013.01); *B64D 47/06* (2013.01); *F21S 45/30* (2018.01); *F21V 31/005* (2013.01); *F21V 31/03* (2013.01); *B64D 2203/00* (2013.01); *F21W 2107/30* (2018.01)

(58) Field of Classification Search
CPC ........ B64D 47/02; B64D 47/04; B64D 47/06; B64D 2203/00; F21S 45/30; F21S 45/33; F21S 45/37; F21V 31/005; F21V 31/03
See application file for complete search history.

(56) References Cited

U.S. PATENT DOCUMENTS

| | | | | |
|---|---|---|---|---|
| 4,635,039 A | * | 1/1987 | Gosswiller | B60Q 5/00 340/404.1 |
| 4,733,335 A | * | 3/1988 | Serizawa | B60Q 1/302 362/503 |
| 4,796,163 A | | 1/1989 | Dressler | |

(Continued)

FOREIGN PATENT DOCUMENTS

| | | |
|---|---|---|
| DE | 102005060736 A1 | 7/2007 |
| EP | 0859188 A2 | 8/1998 |

OTHER PUBLICATIONS

Extended European Search Report for International Application No. 18195931.3 dated Feb. 1, 2019, 5 pages.

*Primary Examiner* — Alexander K Garlen
(74) *Attorney, Agent, or Firm* — Cantor Colburn LLP

(57) ABSTRACT

An exterior aircraft light includes a housing configured to be mounted to an exterior portion of an aircraft; at least one light source mounted to the housing; a lens cover, cooperating with the housing for forming an inner space of the exterior aircraft light, with light from the at least one light source leaving the exterior aircraft light through the lens cover into an outside environment of the aircraft; and a gasket arranged between the housing and the lens cover, the gasket having at least one flap portion forming at least one check valve for fluid discharge from the inner space of the exterior aircraft light towards the outside environment of the aircraft.

16 Claims, 7 Drawing Sheets

(56) References Cited

U.S. PATENT DOCUMENTS

| | | | | |
|---|---|---|---|---|
| 5,293,304 | A * | 3/1994 | Godfrey | B64D 47/06 |
| | | | | 315/315 |
| 5,743,632 | A * | 4/1998 | Carl | F21V 31/03 |
| | | | | 362/294 |
| 5,775,794 | A * | 7/1998 | Schmitt | F21S 45/33 |
| | | | | 362/507 |
| 6,071,000 | A | 6/2000 | Rapp | |
| 6,168,303 | B1 | 1/2001 | Ashizawa et al. | |
| 7,217,314 | B2 | 5/2007 | DeGuiseppi et al. | |
| 9,797,570 | B2 | 10/2017 | Lee | |
| 9,909,788 | B2 | 3/2018 | Shin et al. | |
| 2005/0157514 | A1 * | 7/2005 | Brinkmann | F21S 45/33 |
| | | | | 362/547 |
| 2009/0268475 | A1 * | 10/2009 | Ball | F21V 29/83 |
| | | | | 362/373 |
| 2010/0008073 | A1 | 1/2010 | Tartock et al. | |
| 2015/0070927 | A1 * | 3/2015 | Kurahashi | B01D 53/26 |
| | | | | 362/546 |
| 2016/0377255 | A1 * | 12/2016 | Schubert | F21S 45/37 |
| | | | | 362/547 |
| 2017/0138584 | A1 * | 5/2017 | Hessling-Von Heimendahl | B64D 47/04 |
| 2017/0363278 | A1 * | 12/2017 | Furuuchi | F21S 41/255 |
| 2018/0106457 | A1 * | 4/2018 | Jauernig | F21S 45/30 |
| 2019/0120456 | A1 * | 4/2019 | Noda | F21S 41/28 |
| 2019/0271450 | A1 * | 9/2019 | Dallos, Jr. | F21S 45/60 |

\* cited by examiner

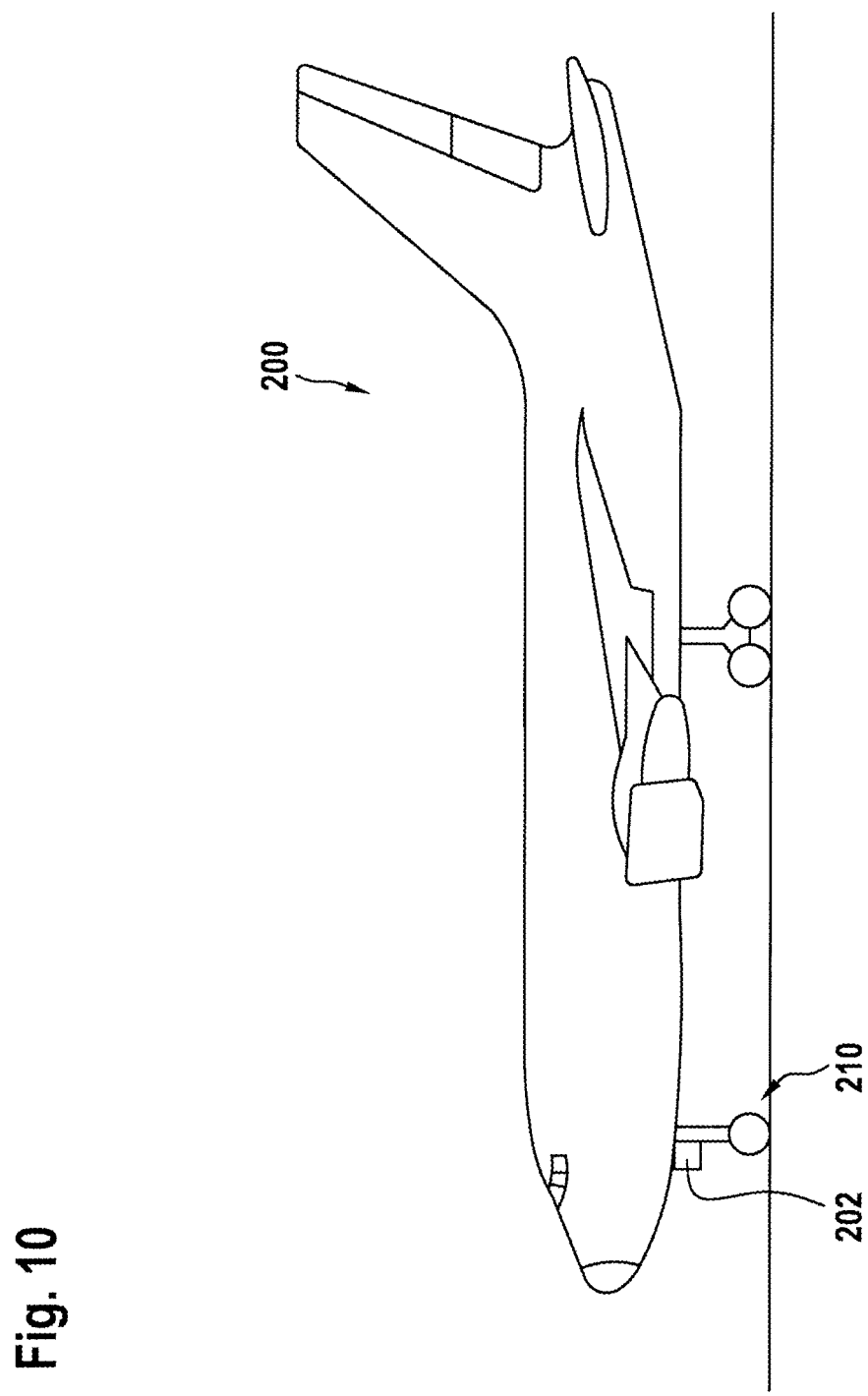

EXTERIOR AIRCRAFT LIGHT AND AIRCRAFT COMPRISING THE SAME

FOREIGN PRIORITY

This application claims priority to European Patent Application No. 18195931.3 filed Sep. 21, 2018, the entire contents of which is incorporated herein by reference.

TECHNICAL FIELD

The present invention relates to exterior aircraft lighting. In particular, it relates to exterior aircraft lights having moisture and/or water build-up therein during operation.

BACKGROUND

Almost all aircraft are equipped with exterior lighting systems. For example, large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

Many exterior aircraft lights suffer from water and/or moisture build-up within the inner space of the exterior aircraft light. In particular, after landing of an aircraft and turning off the exterior aircraft lights, humid air might enter an exterior aircraft light, which may be heated due to its previous operation, and condense on the lens cover and/or accumulate as water within the exterior aircraft light, as a response to the exterior aircraft light cooling down. The presence of moisture and/or water within the exterior aircraft light may degrade its light output. In particular, the moisture and/or water may fog or blur the light output of the exterior aircraft light. Previous approaches of dealing with the build-up of moisture and/or water have not been entirely satisfactory.

Accordingly, it would beneficial to provide an exterior aircraft light that effectively deals with moisture and/or water present in the inner space of the exterior aircraft light. Further, it would be beneficial to provide an aircraft equipped with such exterior aircraft light(s).

SUMMARY

Exemplary embodiments of the invention include an exterior aircraft light comprising a housing configured to be mounted to an exterior portion of an aircraft; at least one light source mounted to the housing; a lens cover, cooperating with the housing for forming an inner space of the exterior aircraft light, with light from the at least one light source leaving the exterior aircraft light through the lens cover into an outside environment of the aircraft; and a gasket arranged between the housing and the lens cover, the gasket having at least one flap portion forming at least one check valve for fluid discharge from the inner space of the exterior aircraft light towards the outside environment of the aircraft.

Exemplary embodiments of the invention allow for an effective draining of the inner space of the exterior aircraft light, while having comparably low complexity. In particular, the gasket having at least one flap portion forming at least one check valve provides for opening a discharge path from the inner space of the exterior aircraft light to the outside environment of the aircraft, when a local underpressure is present on the outside of the exterior aircraft light. Such local underpressure may be present during flight of the aircraft, when the airstream along the lens cover provides for a relative underpressure with respect to the inner space of the exterior aircraft light. The local underpressure may in particular be created by the Venturi effect. In this way, the at least one flap portion may open the inner space of the exterior aircraft light to the outside environment of the aircraft during flight, while preventing the ingress of other fluids, such as de-icing fluids, when on the ground. With the gasket having at least one flap portion forming at least one check valve, the functionality of the gasket, which generally provides a seal between the housing and the lens cover, can be extended. As compared to previous approaches, which relied on the provision of hygroscopic material for absorbing moisture within the inner space of the exterior aircraft light or which relied on complex flow paths through membranes for moisture discharge, exemplary embodiments of the invention allow for an effective and comparably less complex discharge of moisture and/or water.

The housing is configured to be mounted to an exterior portion of an aircraft. In particular, the housing may be configured to be mounted to a corresponding recess in an exterior portion of an aircraft. The recess may be a recess in the aircraft skin/outer shell of the aircraft.

The at least one light source is mounted to the housing of the exterior aircraft light. In particular, the at least one light source may be mounted to the housing via a suitable mounting structure, such as a suitable mounting board, for example a printed circuit board.

The at least one light source may be at least one LED. The at least one light source may be provided with an optical system for shaping the light output of the exterior aircraft light. The optical system may have one or more reflectors and/or one or more lenses and/or one or more shutters. The optical system may have one or more optical elements for re-directing and/or blocking the light emitted by the at least one light source.

The light from the at least one light source leaves the exterior aircraft light through the lens cover. In this way, the lens cover forms the light emission portion of the exterior aircraft light. The term lens cover is generally used in the art for the structure through which the light leaves the exterior aircraft light, irrespective of whether the lens cover has a significant effect on the light intensity distribution of the light output or not. The lens cover of the exterior aircraft light of exemplary embodiments of the invention may have a refractive impact on the light coming from the at least one light source. It is also possible that the lens cover may have a negligible or even substantially no impact on the light intensity distribution.

The at least one flap portion of the gasket forms at least one check valve for fluid discharge from the inner space of the exterior aircraft light towards the outside environment of the aircraft. It may also be said that the at least one flap portion forms at least one one-way valve for fluid discharge. While fluids, such as moisture and water, may be discharged from the inner space of the exterior aircraft light towards the outside environment, the check valve(s)/one-way valve(s) may prevent the ingress of de-icing fluids or cleaning fluids, when directed towards the exterior aircraft light on the ground.

According to a further embodiment, the at least one check valve provides for a direct path between the inner space of the exterior aircraft light and the outside environment of the aircraft. In this way, water and/or moisture may leave the exterior aircraft light in a particularly unimpeded manner. Small pressure differences may already be sufficient for effectively draining the inner space of the exterior aircraft light, given the direct path between the inner space and the outside environment.

According to a further embodiment, the at least one check valve is free of a waterproof membrane. In this way, the discharge path between the inner space of the exterior aircraft light and the outside environment of the aircraft is free of a waterproof membrane. Accordingly, moisture within the exterior aircraft light does not have to pass such waterproof membrane and may flow out of the exterior aircraft light in a particularly unimpeded manner. In particular, the at least one check valve may be free of a semi-permeable membrane, e.g. free of a waterproof, moisture permeable membrane, as has been used in previous approaches.

According to a further embodiment the gasket is made from rubber. Rubber is a suitable material for achieving the sealing function of the gasket on the one hand and for achieving the valve function of the at least one flap portion on the other hand. In a particular embodiment, the gasket is made from fluorosilicone rubber.

According to a further embodiment, the at least one flap portion is a plurality of flap portions. In particular, the gasket may have 2 or 3 or 4 or 5 or 6 or 7 or 8 or 9 or 10 or more flap portions. The plurality of flap portions may form a plurality of check valves that work independently from each other.

According to a further embodiment, the housing comprises a lens retainer structure, to which the lens cover is attached. The gasket may be arranged between the lens cover and the lens retainer structure. The lens retainer structure may be a frame structure, which may be arranged around the circumference of the housing and which may provide an engagement structure for the lens cover all around the lens cover. The attachment between the lens cover and the lens retainer structure may be achieved in any suitable manner. A plurality of bushings may be provided in the lens cover for exerting a suitable pressure onto the gasket towards the lens retainer structure for achieving the desired sealing effect of the gasket.

According to a further embodiment, the lens retainer structure comprises at least one recess, whose position corresponds to the at least one flap portion of the gasket. The at least one recess may form at least one water collection portion, when the at least one flap portion is in a closed position, and may form at least one drainage hole, when the at least one flap portion is an open position. The at least one recess may have a tapered surface. In this way, the moisture and/or water may be directed towards the flap portion in a funnel-like manner.

According to a further embodiment, a gap is provided between the lens cover and the lens retainer structure, at least where the gasket has the at least one flap portion. The moisture and/or water, when exiting the inner space of the exterior aircraft light through the at least one check valve formed by the at least flap portion, may pass through this gap between the lens cover and the lens retainer structure into the outside environment of the aircraft. The gap may allow for an unimpeded fluid connection between the at least one check valve and the outside environment of the aircraft.

According to a further embodiment, the exterior aircraft light further comprises at least one air inlet for introducing air from outside of the exterior aircraft light into the inner space of the exterior aircraft light. In this way, an airstream through the inner space of the exterior aircraft light from the at least one air inlet towards the at least one flap portion may be achieved. This airstream may bring fresh air into the inner space of the exterior aircraft light and may take moisture and/or water out of the exterior aircraft light in a particularly effective manner. In particular, the airstream may flow over the inner surface of the lens cover. In this way, the airstream may remove moisture and/or water from an area that is particularly prone to causing fogging problems to the light output of the exterior aircraft light.

According to a further embodiment, the at least one air inlet is provided with a semi-permeable membrane. The semi-permeable membrane may be a waterproof, air permeable membrane. In this way, the introduced air may be substantially or entirely free of moisture and/or water, thus preventing ingress of further water particles through the at least one air inlet. While the outside air generally has low water content at cruising altitude, the presence of the semi-permeable membrane may be particularly useful during ascent or descent of the aircraft.

According to a further embodiment, the at least one air inlet is provided in the housing. In this way, the at least one air inlet does not interfere with or provide any constraints on the positioning and attaching of the lens cover. Also, the at least one air inlet in the housing may receive air from an airstream having a lower speed than the airstream along the outer surface of the lens cover, thus helping in the opening of the at least one check valve due to the Venturi effect.

According to a further embodiments, the at least one air inlet is a plurality of air inlets. In particular, the exterior aircraft light may comprise 2 or 3 or 4 or 5 or 6 or 7 or 8 or 9 or 10 or more air inlets.

According to a further embodiment, the at least one air inlet is provided in a first end portion of the exterior aircraft light and the at least one flap portion is provided in a second end portion of the exterior aircraft light, opposite the first end portion. In this way, an airstream from the at least one air inlet to the at least one flap portion may flow through a large portion or substantially all of the inner space of the exterior aircraft light. Moisture and/or water build-up in various corners of the inner space of the exterior aircraft light may be effectively drained out via this airstream.

According to a further embodiment, the lens cover and the housing form a step contour around the at least one flap portion. In other words, the portion of the housing surrounding the lens cover may be recessed with respect to the outer surface of the lens cover, when extending the geometry of the outer surface of the lens cover beyond its edges. In the exemplary case of the outer surface of the lens cover being a substantially plane structure, the portion of the housing surrounding the lens cover may be recessed as compared to said plane. As laid out above, the housing may comprise a lens retainer structure, which forms a frame structure around the lens cover. This lens retainer structure may be recessed as compared to the lens cover, i.e. the lens cover and the lens retainer structure may form a step contour. This step contour may be present around the entire lens cover or may be present only where the at least one flap portion is. It may also be present on the side of the gasket where the at least one flap portion is or along a portion of the gasket containing the at least one flap portion. The step contour helps in generating a local underpressure on the outside of the at least one flap portion of the gasket, thus helping in an effective opening in the at least one flap portion during operation. As laid out above, there may be a gap between the lens cover and the lens retainer structure, through which the water and/or moisture is drained out. The term step contour may relate to the extension of the lens cover and the lens retainer structure on opposite sides of this gap. In other words, the extensions on both sides of the gap may be compared to each other for determining whether such a step contour is present.

According to a further embodiment, the at least one light source is mounted to a mounting board, such as a printed circuit board, with the mounting board being arranged in proximity to the at least one flap portion. In particular, the mounting board may be arranged within a distance to the at least one flap portion that is at most 20%, in particular at most 10% of the extension of the lens cover. With the mounting board being arranged in proximity to the at least one flap portion, a warm air turbulence or warm air swirl may be generated at the mounting board, where heat is generated by the at least one light source. This warm air turbulence/warm air swirl may help in picking up further moisture within the inner space of the exterior aircraft light and may also help in providing an efficient cooling airstream for the at least one light source.

According to a further embodiment, the exterior aircraft light is one of a position light, a white anti-collision strobe light, a red beacon light, a landing light, a runway turn-off light, a taxi light, a take-off light, a wing scan light, a stabilizer illumination light, and a cargo light. It is also possible that the exterior aircraft light is a multi-functional light providing at least two of the functionalities of a position light, a white anti-collision strobe light, a red beacon light, a landing light, a runway turn-off light, a taxi light, a take-off light, a wing scan light, a stabilizer illumination light, and a cargo light.

Exemplary embodiments of the invention further include an aircraft comprising at least one exterior aircraft light in accordance with any of the embodiments described above. The aircraft may be an air plane. The aircraft may also be a helicopter. The modifications, additional features and beneficial effects, described above with respect to the exemplary embodiments of the exterior aircraft light, apply to the aircraft in an analogous manner.

According to a further embodiment, the at least one flap portion is provided in a bottom region of the exterior aircraft light. In particular, the at least one flap portion may be provided in a region where water accumulates, when the at least one check valve is closed. It is possible that an exterior aircraft light according to exemplary embodiments of the invention has various mounting orientations with respect to an aircraft, depending on the desired use thereof. It is possible that the exterior aircraft light has two or more flap portions, with at least one flap portion being provided in a respective bottom region of the exterior aircraft light in the different mounting orientations. The term bottom region refers to a lower portion of the exterior aircraft light, when assembled to the aircraft, i.e. it refers to the orientation of the exterior aircraft light in the aircraft frame of reference.

According to a further embodiment, the exterior aircraft light comprises at least one air inlet. This at least one air inlet may have the properties and features, as described above with respect to the exterior aircraft light. The at least one air inlet may be in air communication with a non-pressurized air volume on the inside of the aircraft skin. In other words, the at least one air inlet may be in air communication with a non-pressurized air volume on the inside of the aircraft outer shell/aircraft body shell. Such non-pressurized air volumes exist between the outer aircraft skin and the pressurized volume of the aircraft cabin. For example, such non-pressurized air volumes may be present in the aircraft wings or in aircraft belly fairings or in other portions of the aircraft. Drawing air into the exterior aircraft light from such non-pressurized air volumes allows for drawing fresh atmospheric air into the exterior aircraft light, while using air with a lower air speed then the airstream around the aircraft, thus helping in effectively drawing the air out of the exterior aircraft light via the at least one flap portion again.

According to a further embodiment, the at least one flap portion is aft of the at least one air inlet. In this way, the main airstream direction through the exterior aircraft light corresponds well to the airstream along the aircraft on its outside.

According to a further embodiment, the at least one flap portion is lower than the at least one air inlet. In this way, the airstream through the exterior aircraft light correlates in direction with gravity, thus helping in an effective transport of water and/or moisture out of the exterior aircraft light.

When talking about the orientation of the exterior aircraft light within the aircraft, the terms front, aft, higher and lower refer to the aircraft frame of reference. In particular, they relate to the aircraft frame of reference when the aircraft is standing on the ground or flying straight at cruising altitude.

BRIEF DESCRIPTION OF THE DRAWINGS

Further exemplary embodiments of the invention are described in detail below with reference to the Figures, wherein:

FIG. 10 shows another air plane in accordance with an exemplary embodiment of the invention, equipped with an exterior aircraft light in accordance with an exemplary embodiment of the invention, mounted to a running gear of the air plane;

DETAILED DESCRIPTION

Figure 1:
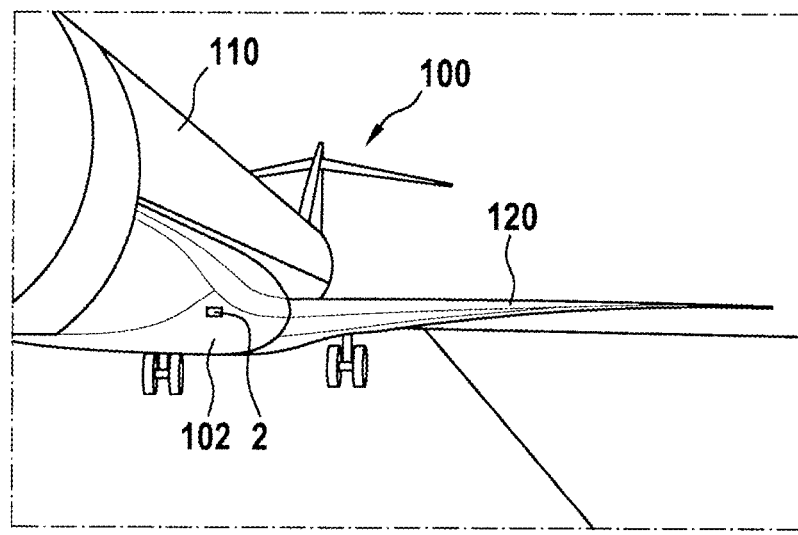
FIG. 1 shows an air plane in accordance with an exemplary embodiment of the invention, equipped with an exterior aircraft light in accordance with an exemplary embodiment of the invention, positioned in the belly fairing of the aircraft.

FIG. 1 shows an air plane 100 in accordance with an exemplary embodiment of the invention, equipped with an exterior aircraft light 2 in accordance with an exemplary embodiment of the invention. The airplane 100 is shown in a partial perspective view, depicting inter alia part of the fuselage 110 and the left wing 120. The exterior aircraft light 2 is arranged in an exterior portion of the air plane 100. In particular, the exterior aircraft light 2 is mounted to a belly fairing 102 of the air plane 100. The term belly fairing refers to the skin structure of the air plane 100 that provides for a smooth transition between the fuselage and the wings. It is pointed out that exterior aircraft lights in accordance with exemplary embodiments of the invention may also be provided in other exterior portions of the air plane 100.

Figure 2:
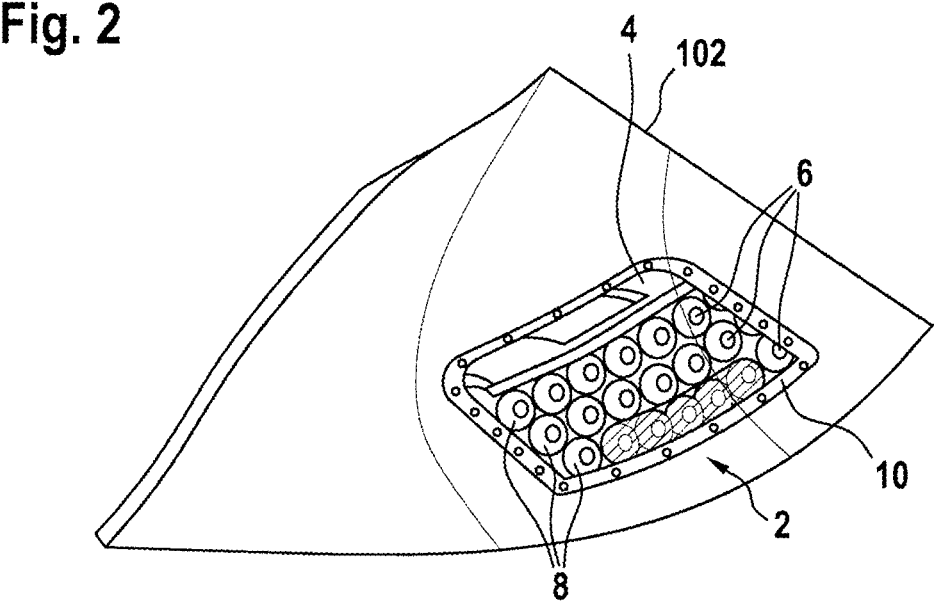
FIG. 2 shows a portion of the belly fairing of the aircraft of FIG. 1 in an enlarged view, the depicted portion containing the exterior aircraft light of FIG. 1.

FIG. 2 shows an enlarged view of a portion of the belly fairing 102, said portion containing the exterior aircraft light 2.

The exterior aircraft light 2 comprises a housing 4, a plurality of light sources 6, a plurality of reflectors 8, and a lens cover 10. As the lens cover 10 is transparent, the housing 4, the plurality of lights sources 6, and the plurality of reflectors 8 are visible in the viewing direction of FIG. 2, although they are arranged behind the lens cover 10. The plurality of light sources and the plurality of reflectors 8 are mounted to a back wall of the housing 4 via a mounting board. Each of the plurality of reflectors 8 is associated with one of the plurality of light sources 6. In the exemplary embodiment of FIG. 2, the plurality of reflectors 8 are collimating reflectors, providing for an at least partial collimation of the light emitted from the respective light sources 6. In the exemplary embodiment of FIG. 2, the light sources 6 are LEDs.

The exterior aircraft light 2 of FIG. 2 may be a combined taxiing, take-off, landing, and runway turn-off light. It is also possible that the exterior aircraft light 2 has only one or only a subset of these functionalities. In addition/alternatively, the exterior aircraft light 2 may have one or more other functionalities, such as cargo light functionality.

Figure 3:
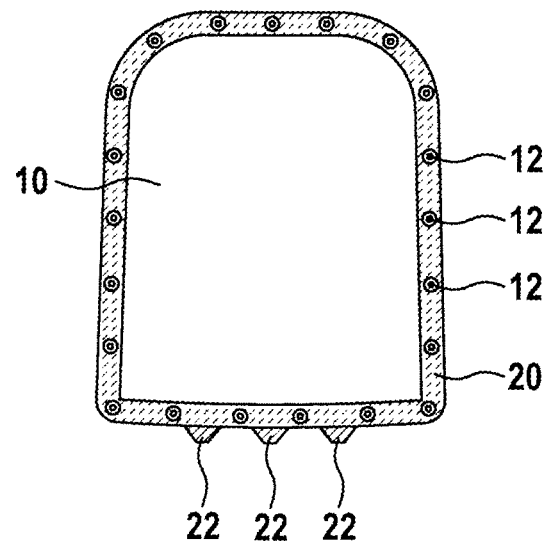
FIG. 3 shows a combination of an exemplary lens cover and an exemplary gasket, which may be used in an exterior aircraft light in accordance with exemplary embodiments of the invention.

FIG. 3 shows a lens cover 10, which may be used in exterior aircraft lights in accordance with exemplary embodiments of the invention, in a front view. The lens cover 10 may for example be used in the exterior aircraft light 2 of FIG. 2. A gasket 20 is arranged behind the lens cover 10 in the viewing direction of FIG. 3. Due to the transparency of the lens cover 10, the gasket 20 is visible as a frame structure around the periphery of the lens cover 10.

The gasket 20 has a substantially rectangular shape and has a substantially constant width in most portions along its frame shape. In the exemplary embodiment of FIG. 3, the gasket 20 has three flap portions 22, which extend from underneath the transparent lens cover 10. In other words, the three flap portions 22 extend beyond the outer edge of the lens cover 10 in three different locations. These three flap portions 22 operate as three check valves, as will be explained below.

The lens cover 10 is provided with a plurality of bushings 12, which are arranged along the periphery of the lens cover 10. In particular, the bushings 12 are arranged in a spaced manner along that portion of the lens cover 10 where the gasket 20 is provided underneath. When assembled to the housing, the bushings 12 provide for suitable pressure between the lens cover 10 and the housing, such that the gasket 20 performs its sealing function.

Figure 4:
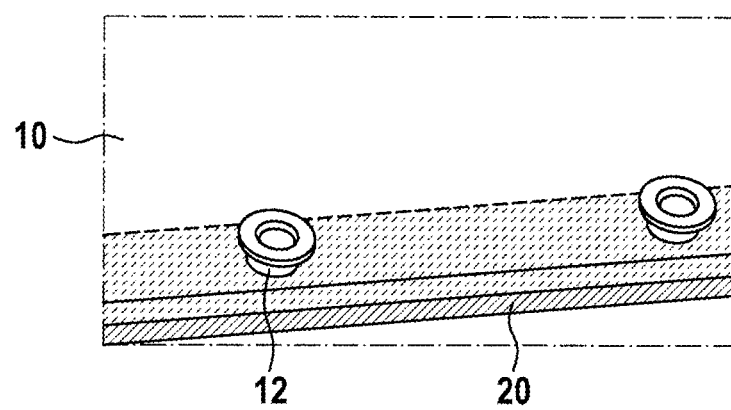
FIG. 4 shows a portion of the combination of FIG. 3 in an enlarged perspective view.

FIG. 4 shows a portion of the lens cover 10 and the gasket 20 of FIG. 3 in an enlarged perspective view. The bushings 12 extend through the lens cover 10, in order to exert pressure onto the gasket 20, as explained above. It is pointed out that the bushings 12 are one of a variety of options to push the gasket 20 in sealing contact with the housing 4.

Figure 5:
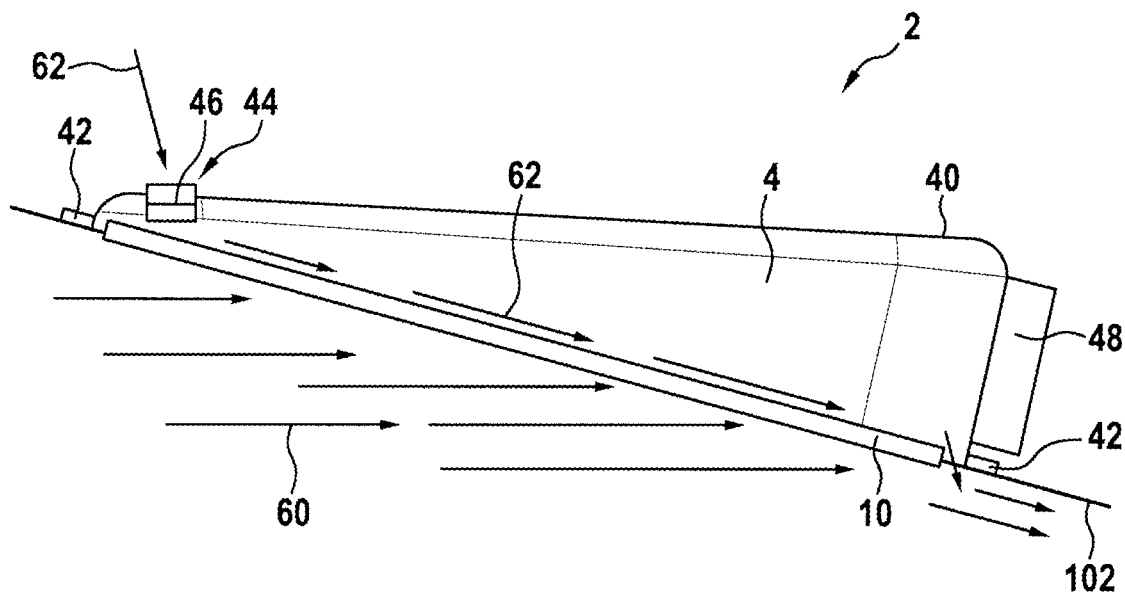
FIG. 5 shows an exterior aircraft light in accordance with an exemplary embodiment of the invention in a schematic cross-sectional view, the cross-sectional plane substantially corresponding to a longitudinal cross-section in the aircraft frame of reference.

FIG. 5 shows an exterior aircraft light 2 in accordance with an exemplary embodiment of the invention in a cross-sectional view. The cross-sectional view of FIG. 5 is a vertical cross-sectional view that is roughly in the front-to-back direction of the aircraft.

The exterior aircraft light 2 is depicted in an orientation corresponding to the mounting position in an aircraft. This is illustrated by the lens cover 10 forming an acute angle with the direction of an impinging airstream during cruise flight of the aircraft, illustrated by arrows 60. The direction of the impinging airstream 60 is substantially horizontal during cruise flight of the aircraft.

The housing 4 comprises a wall structure 40, which is substantially L-shaped in the cross-sectional view of FIG. 5. In three dimensions, the wall structure 40 has the shape of a dust pan or partial tub, turned upside down. The housing 4 has a flange 42 around the circumference of the wall structure 40. The flange 42 is provided for attachment of the housing 4 to the belly fairing 102, in particular to the aircraft skin in the region of the belly fairing 102. The housing 4 further comprises a cooling rib structure 48 arranged on the shorter leg of the L-shaped wall structure 40 in the cross-sectional view of FIG. 5. To the inside of the cooling rib structure 48, a plurality of light sources and a plurality of reflectors are provided, which are not depicted in FIG. 5 for ease of illustration.

The housing 4 further comprises an air inlet 44 in a front end portion of the exterior aircraft light 2, depicted to the left in the viewing direction of FIG. 5. The air inlet 44 has a waterproof, air-permeable membrane 46. The air inlet 44 provides for the ingress of air from the non-pressurised volume within the belly fairing 102, as illustrated by arrows 62, which depict the air flow through the exterior aircraft light 2. After being introduced into the inner space of the exterior aircraft light 2 via the air inlet 44, the airstream 62 flows along the inner surface of the lens cover 10 and exits the exterior aircraft light 2 through a check valve of the lower aft portion of the exterior aircraft light 2, as described in detail below with respect to FIGS. 6 and 7. After exiting the exterior aircraft light 2, said airstream 62 joins the impinging airstream 60 along the belly fairing 102.

Figure 6:
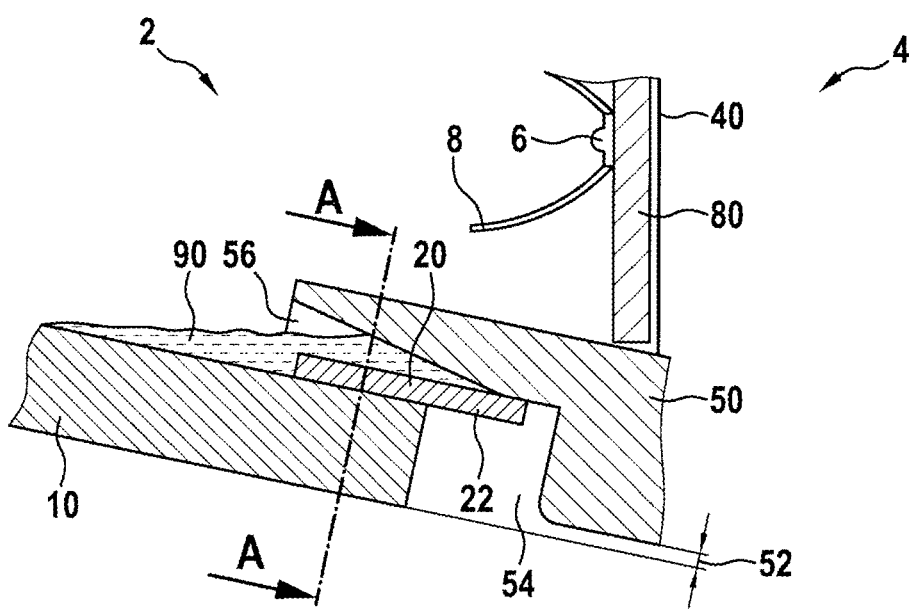
FIG. 6 shows a lower rear portion of the exterior aircraft light of FIG. 5 in an enlarged view in a first operating state.

FIG. 6 shows the lower aft portion of the exterior aircraft light 2 of FIG. 5 in an enlarged view, i.e. it shows the lower right end portion of the exterior aircraft light 2 of FIG. 5 in an enlarged view. FIG. 6 shows this portion of the exterior aircraft light 2 in greater detail than FIG. 5, as will be laid out below.

In FIG. 6, a portion of the wall structure 40 of the housing 4 is depicted. Also, a portion of a mounting board 80, which is a printed circuit board (PCB), is depicted. The mounting board 80 is attached to the wall structure 40. Out of the plurality of light sources 6 and the plurality of reflectors 8, one light source 6 and one reflector 8 are shown in FIG. 6. The light source and the reflector 8 are attached to the mounting board 80. The housing 4 further comprises a lens retainer structure 50, a portion of which is shown in FIG. 6.

The lens cover 10 is attached to the lens retainer structure 50, with the gasket 20 positioned therebetween. The gasket 20 is generally sandwiched between the lens cover 10 and the lens retainer structure 50 in a direction orthogonal to the plane of extension of the lens cover 10. This will also become apparent from the discussion of FIG. 8 below, which shows a further cross-sectional view in the viewing direction A-A, indicated in FIG. 6. In the cross-sectional plane of FIG. 6, the lens retainer structure 50 has a tapered recess 56, which provides for a localized, hole-like structure between the gasket 20 and the lens retainer structure 50.

Further, a gap 54 is provided between the lens cover 10 and the lens retainer structure 50 in the main plane of extension of the lens cover 10. The gap 54 extends along the lower edge of the lens cover 10 in the viewing direction of FIG. 6. The gap 54 spaces the side face of the lens cover 10 from the lens retainer structure 50. The lens retainer structure 50 extends around the side face of the lens cover 10 and a portion of the inner surface of the lens cover 10, with the gap 54 and the gasket 20 spacing the lens cover 10 from the lens retainer structure 50. The outer surface of the lens retainer structure 50 is recessed, as compared to the outer surface of the lens cover 10, by step 52.

Figure 7:
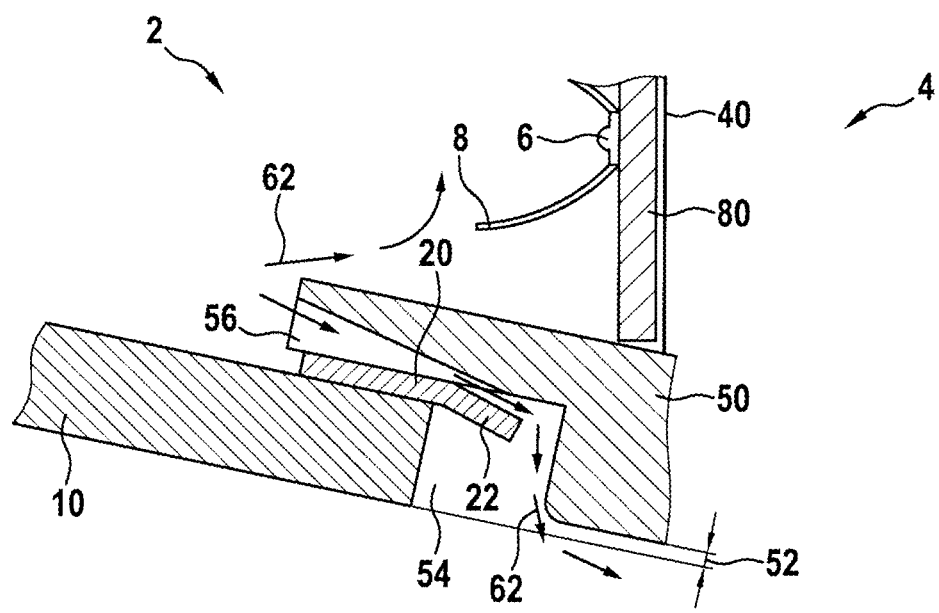
FIG. 7 shows the lower rear portion of the exterior aircraft light of FIG. 6 in a second operating state.

The gasket 20 provides for a sealing between the lens cover 10 and the lens retainer structure 50. It is provided around the circumference of the inner surface of the lens cover 10, extends laterally beyond the upper edge of the side face of the lens cover 10, and extends laterally beyond the lower end of the recess 56 of the lens retainer structure 50 in the cross-sectional plane of FIG. 6. In this way, the recess 56 is sealed with respect to the gap 54 between the lens cover 10 and the lens retainer structure 50 on the outside of the gasket 20. The sealing between the lower end of the recess 56 and the gap 54 is provided by a flap portion 22 of the gasket 20 in the cross-sectional plane of FIG. 6. This flap portion 22 can be in a closed position, as depicted in FIG. 6, and can be in an open position, as depicted in FIG. 7 and described below. The flap portion 22 forms a check valve between the inner space of the exterior aircraft light 2 and the outside environment of the exterior aircraft light 2. In particular, the flap portion 22 forms a check valve between the recess 56 and the gap 54.

As indicated above, the flap portion 22 is depicted in a closed state in FIG. 6. Further, the exterior aircraft light 2 is depicted in FIG. 6 in a state where water 90 has accumulated in the inner space of the exterior aircraft light 2. In particular, said water 90 has accumulated in the recess 56 of the lens retainer structure 50 and in the vicinity thereof. Further in particular, the water 90 has accumulated in the lowest portion of the inner space of the exterior aircraft light 2 due to gravity. Such a situation may occur when the aircraft lands in the evening, the exterior aircraft light 2 is turned off, humid air enters into the inner space of the exterior aircraft light 2, and the water 90 condenses overnight within the inner space of the exterior aircraft light 2.

FIG. 7 shows the portion of the exterior aircraft light 2 of FIG. 6 in the same cross-sectional view, with the flap portion 22 of the gasket 20 being in an open state. In the open state, the flap portion 22 parts from the lens retainer structure 50 and bends into the space 54, thus opening up a fluid discharge path from the recess 56 to the gap 54. This opening of the flap portion 22 may for example occur during flight of the aircraft. During flight, the fast airstream along the outer surface of the lens cover 10 and the lens retainer structure 50 creates a local underpressure on the outside of the flap portion 22, thus drawing the flap portion 22 away from the lens retainer structure 50.

FIG. 7 shows various arrows, generally referred to with reference numeral 62, which illustrate the airstream within and out of the inner space of the exterior aircraft light 2. This airstream is fed from the air inlet 44, shown in and discussed with respect to FIG. 5 above. Part of the airstream 62, having passed the inner surface of the lens cover 10, enters the recess 56 of the lens retainer structure 50, flows through the opening between the flap portion 22 and the lens retainer structure 50, and exits into the outside environment of the airplane via the gap 54. This airstream carries moisture and/or water out of the inner space of the exterior aircraft light 2.

Another portion of the airstream 62 passes by the front edge of the lens retainer structure 50 and flows towards the plurality of light sources 6 and the plurality of reflectors 8. Due to the impeding wall structure 40 and due to the heat, produced by the plurality of light sources 6, this portion of the airstream flows upwards and along the mounting board 80, the plurality of light sources 6, and the plurality of reflectors 8. In this way, a turbulence/swirl is created in the inner space of the exterior aircraft light 2. This turbulence/swirl may flow backwards along the upper wall of the wall structure 40 towards the air inlet 40 and may then turn towards the backwards airstream along the inner surface of the lens cover 10. In this way, part of the airstream 62 may flow around a large portion of the inner space of the exterior aircraft light 2, taking water and/or moisture from various portions thereof with it and/or transferring heat out of the exterior aircraft light 2. A smaller portion of the airstream may flow towards the plurality of light sources 6 and the plurality of reflectors 8. For example, it is possible that about 75% of the airstream 62 reaching the lens retainer structure 50 flow out through the recess 56, while about 25% of the airstream 62 flow towards the plurality of light sources 6 and the plurality of reflectors 8.

As stated above, the local underpressure to the outside of the flap portion 22, created by the airstream along the outside of the exterior aircraft light 2 due to the Venturi effect, may open the flap portion 22 during flight. The step 52 helps in creating this local underpressure, because the airstream along the outer surface of the lens cover 10 is suddenly given a larger volume, thus temporarily reducing the static pressure thereof. The flap portion 22 provides an effective way of opening the inner space of the exterior aircraft light 2 towards the outside environment of the aircraft during flight, while closing the inner space of the exterior aircraft light 2 in response to pressure exerted from the outside, such as when the aircraft is subjected to de-icing fluid or cleaning fluid.

As stated above, the airstream 62 may take water and/or moisture out of the inner space of the exterior aircraft light 2. Also, gravity helps in draining water out of the inner space of the exterior aircraft light 2. When comparing FIG. 6 and FIG. 7, it can be seen that the water 90 has drained out through the check valve formed by the flap portion 22, when in an open position.

It is pointed out that FIGS. 6 and 7 are highly schematic and are primarily intended to illustrate the operating principle of the flap portion 22, which forms a check valve between the inner space of the exterior aircraft light and the outside environment of the exterior aircraft light 2. In particular, the individual elements are not to scale and may have different relative dimensions. For example, the wall structure 40 is shown in a highly schematic manner as a line structure, while actual implementations may have more robust dimensions for supporting the exterior aircraft light 2.

The lens retainer structure 50 is part of the housing 4. It may be provided in an integrated manner with the wall structure 40. It may also be a separate part, as shown in FIGS. 6 and 7, which may be attached to the wall structure 40. Also, it may be attached to or even part of the outer skin of the aircraft. In this case, the lens retainer structure 50 is still considered part of the housing 40, because it jointly forms the inner space of the exterior aircraft light 2 together with the wall structure 40 and the lens cover 10.

Figure 8:
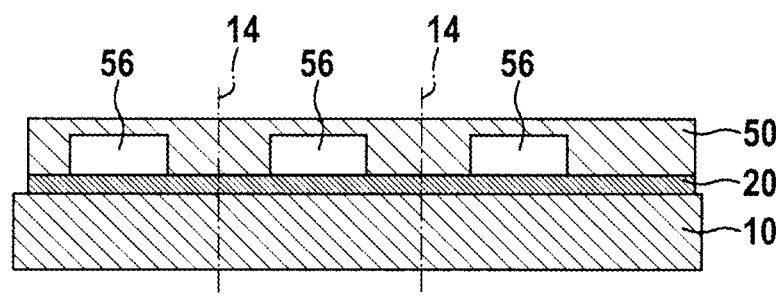
FIG. 8 shows another schematic cross-sectional view through the lower rear portion of the exterior aircraft light of FIGS. 5 to 7.

FIG. 8 shows selected components of the exterior aircraft light 2 of FIGS. 6 and 7 in a further cross-sectional view, which is orthogonal to the cross-sectional view of FIGS. 6 and 7 and whose viewing direction is indicated with A-A in FIG. 6. In particular, FIG. 8 shows the sandwich structure of the lens cover 10, the gasket 20, and the lens retainer structure 50. These three components are in contact with each other, except for those positions where the lens retainer structure 50 has recesses 56. The lens retainer structure 50 has three recesses 56, one of which is depicted in FIGS. 6 and 7. The gasket 20 has three flap portions 22, whose positions correspond to the positions of the three recesses 56. As is apparent from FIGS. 6 and 7, these three flap portions 22 are positioned behind the drawing plane of FIG. 8.

In addition, FIG. 8 shows two fastening positions 14, where the attachment between the lens cover 10, the gasket 20, and the lens retainer structure 50 takes place. At the fastening positions 14, there may be provided fastening screws or fastening bolts or any other suitable kind of fastening means. The fastening positions 14 are schematically indicated via dashed lines in FIG. 8.

FIG. 9 shows a lens cover 10 of an exterior aircraft light in accordance with another exemplary embodiment of the invention in a front view. FIG. 9 illustrates the positioning of three flap portions 22 of the gasket 20, which is arranged behind the lens cover 10 in the viewing direction of FIG. 9, in a highly schematic manner. The lens cover 10 of the exemplary embodiment of FIG. 9 has a generally circular structure. Also, the plurality of light sources and plurality of optical systems, which are arranged behind the lens cover 10, are arranged on a generally circular mounting board. Further, the housing arranged behind the mounting board has a generally cylindrical structure.

Figure 9A:
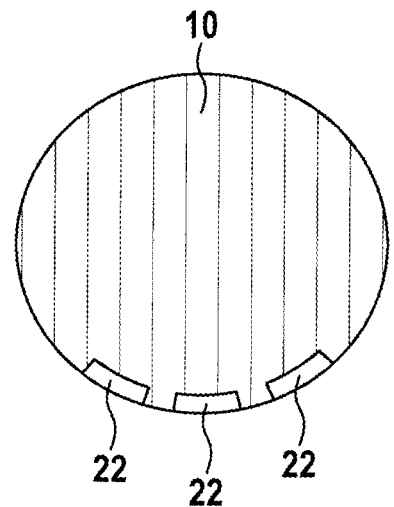
FIG. 9A shows a lens cover of another exterior aircraft light in accordance with exemplary embodiments of the invention.
Figure 9B:
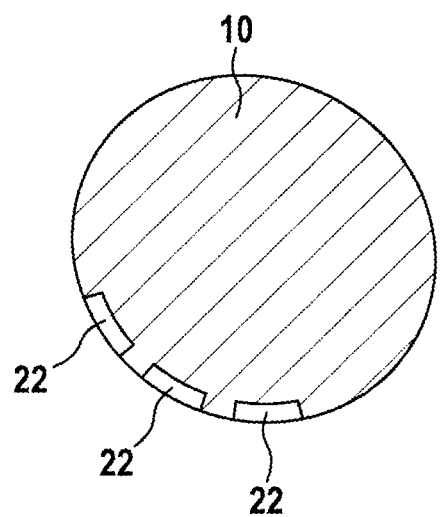
FIG. 9B shows a lens cover of another exterior aircraft light in accordance with exemplary embodiments of the invention.

With this circular/cylindrical shape, such an exterior aircraft light is adapted to be positioned on the aircraft in different orientations. In particular, the exterior aircraft light may be mounted to the aircraft with different degrees of rotation of the exterior aircraft light. This is illustrated in FIGS. 9A and 9B, wherein the same exterior aircraft light is depicted schematically in respective front views, showing the lens cover 10, in two different positions. The different positions of FIGS. 9A and 9B have a relative rotation of between 30° and 40° with respect to each other. The two positions and their relative rotation illustrate that, despite the depicted rotation, one of the flap portions 22 is provided in the bottom portion of the exterior aircraft light, respectively. In this way, while all of the flap portions 22 contribute to directing air flow out of the inner space of the exterior aircraft light, there is one flap portion in both orientations that allows for gravity-assisted draining of water therethrough. Such circular exterior aircraft lights may be provided at the running gears of air planes or helicopters. As explained above, they may be provided in different orientations and provide for a highly effective draining in different rotations.

FIG. 10 shows an air plane 200 in accordance with an exemplary embodiment of the invention. The air plane 200 is equipped with an exterior aircraft light 202 in accordance with an exemplary embodiment of the invention. The exterior aircraft light 202 is mounted to a front running gear 210 of the air plane 200. The exterior aircraft light 202 may be an exterior aircraft light with a substantially circular lens cover, as described above with respect to FIG. 9.

Figure 11:
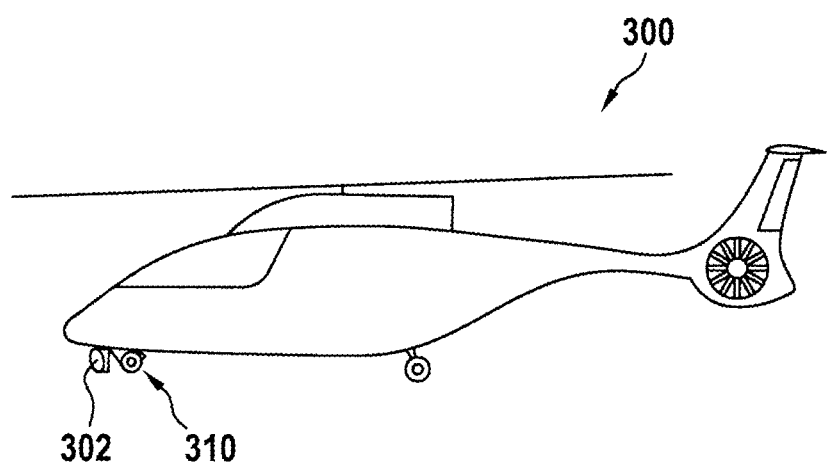
FIG. 11 shows a helicopter in accordance with an exemplary embodiment of the invention, equipped with an exterior aircraft light in accordance with an exemplary embodiment of the invention, mounted to a running gear of the helicopter.

FIG. 11 shows a helicopter 300 in accordance with an exemplary embodiment of the invention. The helicopter 300 is equipped with an exterior aircraft light 302 in accordance with an exemplary embodiment of the invention. The exterior aircraft light 302 is mounted to a front wheel suspension 310 of the helicopter 300. The exterior aircraft light 302 may be an exterior aircraft light with a substantially circular lens cover, as described above with respect to FIG. 9.

The housing of the exterior aircraft lights 202, 302 may be attached to the front running gear 210/to the front wheel suspension 310 via a suitable mounting structure. For example, the housing may be mounted to a U-shaped carrier structure, which is in turn attached to the front running gear 210 or to the front wheel suspension 310.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light comprising:
    a housing configured to be mounted to an exterior portion of an aircraft,
    at least one light source mounted to the housing,
    a lens cover, cooperating with the housing for forming an inner space of the exterior aircraft light, with light from the at least one light source leaving the exterior aircraft light through the lens cover into an outside environment of the aircraft, and
    a gasket arranged between the housing and the lens cover, the gasket having at least one flap portion forming at least one check valve for fluid discharge from the inner space of the exterior aircraft light towards the outside environment of the aircraft.

2. The exterior aircraft light according to claim 1, wherein the at least one check valve provides for a direct path between the inner space of the exterior aircraft light and the outside environment of the aircraft, wherein the at least one check valve is in particular free of a waterproof membrane.

3. The exterior aircraft light according to claim 1, wherein the gasket is made from rubber, in particular from fluorosilicone rubber.

4. The exterior aircraft light according to claim 1,
    wherein the housing comprises a lens retainer structure,
    wherein the gasket is arranged between the lens cover and the lens retainer structure, and
    wherein the lens retainer structure comprises at least one recess, whose position corresponds to the at least one flap portion of the gasket.

5. The exterior aircraft light according to claim 1, further comprising at least one air inlet for introducing air from outside of the exterior aircraft light into the inner space of the exterior aircraft light.

6. The exterior aircraft light according to claim 5, wherein the at least one air inlet is provided with a semi-permeable membrane, in particular with a waterproof, air-permeable membrane.

7. The exterior aircraft light according to claim 5, wherein the at least one air inlet is provided in the housing.

8. The exterior aircraft light according to claim 5, wherein the at least one air inlet is provided in a first end portion of the exterior aircraft light and wherein the at least one flap portion is provided in a second end portion of the exterior aircraft light, opposite the first end portion.

9. The exterior aircraft light according to claim 1, wherein the lens cover and the housing form a step contour around the at least one flap portion.

10. The exterior aircraft light according to claim 1, wherein the at least one light source is mounted to a mounting board, such as a printed circuit board, with the mounting board being arranged in proximity to the at least one flap portion.

11. The exterior aircraft light according to claim 1, wherein the exterior aircraft light is one of a position light, a white anti-collision strobe light, a red beacon light, a landing light, a runway turn-off light, a taxi light, a take-off light, a wing scan light, a stabilizer illumination light, a cargo light, and a multi-functional light providing at least two of the functionalities of a position light, a white anti-collision strobe light, a red beacon light, a landing light, a runway turn-off light, a taxi light, a take-off light, a wing scan light, a stabilizer illumination light, and a cargo light.

12. An Aircraft, comprising:
at least one exterior aircraft light according to claim 1.

13. The aircraft according to claim 12, wherein the at least one flap portion is provided in a bottom region of the exterior aircraft light.

14. The aircraft according to claim 1, wherein the exterior aircraft light comprises at least one air inlet, wherein the at least one air inlet is in particular in air communication with a non-pressurized air volume on the inside of the aircraft skin.

15. The aircraft according to claim 14, wherein the at least one flap portion is aft of the at least one air inlet.

16. The aircraft according to claim 14, wherein the at least one flap portion is lower than the at least one air inlet.

\* \* \* \* \*